US010891809B2

(12) United States Patent
Liu et al.

(10) Patent No.: US 10,891,809 B2
(45) Date of Patent: Jan. 12, 2021

(54) INTELLIGENT DIAGNOSIS ASSISTANCE METHOD, DEVICE AND EQUIPMENT

(71) Applicant: Shenzhen Launch Software Co., Ltd., Shenzhen (CN)

(72) Inventors: Jun Liu, Shenzhen (CN); Zewei Wei, Shenzhen (CN); Wei Zhan, Shenzhen (CN)

(73) Assignee: SHENZHEN LAUNCH SOFTWARE CO., LTD, Guangdon (CN)

(*) Notice: Subject to any disclaimer, the term of this patent is extended or adjusted under 35 U.S.C. 154(b) by 119 days.

(21) Appl. No.: 16/305,238

(22) PCT Filed: Mar. 20, 2018

(86) PCT No.: PCT/US2018/079611
§ 371 (c)(1),
(2) Date: Nov. 28, 2018

(65) Prior Publication Data
US 2020/0226855 A1    Jul. 16, 2020

(51) Int. Cl.
*G07C 5/08* (2006.01)
*G07C 5/00* (2006.01)
*G10L 15/22* (2006.01)
*G06F 3/16* (2006.01)
*G10L 15/18* (2013.01)

(52) U.S. Cl.
CPC .......... *G07C 5/0808* (2013.01); *G06F 3/167* (2013.01); *G07C 5/008* (2013.01); *G10L 15/1822* (2013.01); *G10L 15/22* (2013.01); *G10L 2015/223* (2013.01); *G10L 2015/228* (2013.01)

(58) Field of Classification Search
CPC ................. G10L 15/1822; G10L 15/22; G10L 2015/228; G10L 2015/223; G06F 3/167; G01M 17/007
See application file for complete search history.

(56) References Cited

U.S. PATENT DOCUMENTS

| | | | | |
|---|---|---|---|---|
| 6,085,428 | A * | 7/2000 | Casby ....................... | B60S 5/00 33/286 |
| 6,735,503 | B2 * | 5/2004 | Ames ....................... | G07C 5/008 701/31.4 |
| 7,099,749 | B2 * | 8/2006 | Voeller .................... | G01B 21/26 33/286 |
| 7,920,944 | B2 * | 4/2011 | Gould .................... | G07C 5/008 340/425.5 |

(Continued)

*Primary Examiner* — Michael J Zanelli
(74) *Attorney, Agent, or Firm* — Rankin, Hill & Clark LLP

(57) ABSTRACT

An intelligent diagnosis assistance method, device and equipment, the method comprises: receiving a voice command inputted by a user; obtaining diagnosis assistance information of a vehicle according to the voice command; displaying the diagnosis assistance information to the vehicle. In the present disclosure, by receiving the voice command inputted by the user, obtaining the diagnosis assistance information of the vehicle according to the voice command, and displaying the diagnosis assistance information to the vehicle, such that the user searches the diagnosis assistance information of the vehicle by way of voice before or when performing a maintenance, there is no need to look over a maintenance manual manually, an efficiency of maintenance is improved, user's time is saved, and conveniences are brought to the user.

12 Claims, 4 Drawing Sheets

(56) References Cited

U.S. PATENT DOCUMENTS

| | | | |
|---|---|---|---|
| 8,428,811 B2* | 4/2013 | Cahill | G07C 5/0808 |
| | | | 340/438 |
| 2016/0267723 A1* | 9/2016 | Rajpathak | G07C 5/0808 |
| 2017/0109947 A1* | 4/2017 | Prokhorov | G07C 5/0841 |

* cited by examiner

INTELLIGENT DIAGNOSIS ASSISTANCE METHOD, DEVICE AND EQUIPMENT

TECHNICAL FIELD

The present disclosure relates to the technical field of vehicles, and more particularly to an intelligent diagnosis assistance method, an intelligent diagnosis assistance device and an intelligent diagnosis assistance equipment.

BACKGROUND

In a vehicle maintenance process, a maintenance personnel can use a diagnostic equipment to perform a diagnosis for the vehicle, the diagnostic equipment may provide a detailed diagnostic process, which facilitates the maintenance personnel in acquiring failure information of the vehicle.

In order to perform the diagnosis for the vehicle much better, except for acquiring the failure information, the maintenance personnel often needs to look over detailed information of the vehicle such as a maintenance manual, and so on, only in this way can a maintenance schedule be determined. Thus, in the maintenance process of the vehicle, the maintenance personnel needs to find and look over files including the maintenance manual, and so on, which is not only inconvenient, but also wastes much working time, thereby resulting in a low maintenance efficiency.

Technical Problem

In view of this, embodiments of the present solution provide an intelligent diagnosis assistance method, device and equipment, which can solve a technical problem that there is a low vehicle maintaining efficiency in related art.

Technical Solution

In a first aspect, embodiments of the present solution provide an intelligent diagnosis assistance method, comprising:
  receiving a voice command inputted by a user;
  obtaining diagnosis assistance information of a vehicle according to the voice command; and
  displaying the diagnosis assistance information to the user.
Optionally, said obtaining the diagnosis assistance information of the vehicle according to the voice command particularly comprises:
  parsing the voice command;
  judging whether the voice command includes a first vehicle identification; and
  obtaining the diagnosis assistance information according to the first vehicle identification if the voice command includes the first vehicle identification; or
  controlling a vehicular device to obtain a second vehicle identification, and obtaining the diagnosis assistance information of the vehicle according to the second vehicle identification if there doesn't exist the diagnosis assistance information.
Optionally, said obtaining the diagnosis assistance information particularly comprises:
  submitting diagnosis assistance information acquisition request to a server; wherein diagnosis assistance information database is preset in the server; and
  receiving the diagnosis assistance information returned by the server.
Optionally, said displaying the diagnosis assistance information to the user particularly comprises:
  broadcasting the diagnosis assistance information to the user in a form of voice, and displaying the diagnosis assistance information on an interface in graphical or a textual form.
Optionally, said presenting the diagnosis assistance information to the user particularly comprises:
  obtaining a current vehicle diagnostic process; and
  displaying the diagnosis assistance information to the user according to the current vehicle diagnostic process.

In a second aspect, the embodiments of the present solution provide an intelligent diagnosis assistance equipment which comprises a storage device, a processor and computer program stored in the storage device and executable by the processor, wherein when the computer program is executed by the processor, the processor is configured to implement steps an intelligent diagnosis assistance method, comprising: receiving a voice command inputted by a user; obtaining diagnosis assistance information of a vehicle according to the voice command; and displaying the diagnosis assistance information to the user.

Optionally, the processor is particularly configured to implement the step of obtaining the diagnosis assistance information of the vehicle according to the voice command by: parsing the voice command; determining whether the voice command includes a first vehicle identification; and obtaining the diagnosis assistance information according to the first vehicle identification if the voice command includes the first vehicle identification; or controlling a vehicular device to obtain a second vehicle identification and obtaining the diagnosis assistance information of the vehicle according to the second vehicle identification, if the voice command doesn't include the first vehicle identification.

Optionally, the processor is particularly configured to implement the step of obtaining the diagnosis assistance information by: submitting diagnosis assistance information acquisition request to a server; wherein diagnosis assistance information database is preset in the server; and receiving the diagnosis assistance information returned by the server.

Optionally, the processor is particularly configured to implement the step of displaying the diagnosis assistance information to the user by: sending the diagnosis assistance information to the user in a form of voice, and displaying the diagnosis assistance information on an interface in the form of graphics or text.

Optionally, the processor is particularly configured to implement the step of displaying the diagnosis assistance information to the user by: obtaining a current vehicle diagnostic process; and displaying the diagnosis assistance information to the user according to the current vehicle diagnostic process.

In a third aspect, the embodiments of the present solution provide a computer readable storage medium which stores computer program, wherein when the computer program is executed by a processor, the processor is configured to implement steps in an intelligent diagnosis assistance method, comprising:
  receiving a voice command inputted by a user;
  obtaining diagnosis assistance information of a vehicle according to the voice command; and
  displaying the diagnosis assistance information to the user.
Optionally, the processor is particularly configured to implement the step of obtaining the diagnosis assistance information of the vehicle according to the voice command by: parsing the voice command; determining whether the voice command includes a first vehicle identification; and obtaining the diagnosis assistance information according to the first vehicle identification if the voice command includes the first vehicle identification; or alternatively controlling a vehicular device to obtain a second vehicle identification and obtaining the diagnosis assistance information of the vehicle according to the second vehicle identification, if the voice command doesn't include the first vehicle identification.

Optionally, the processor is particularly configured to implement the step of obtaining the diagnosis assistance information by:

submitting diagnosis assistance information acquisition request to a server; wherein diagnosis assistance information database is preset in the server; and receiving the diagnosis assistance information returned by the server.

Optionally, the processor is particularly configured to implement the step of displaying the diagnosis assistance information to the user by: sending the diagnosis assistance information to the user in a form of voice, and displaying the diagnosis assistance information on an interface in the form of graphics or text.

Optionally, the processor is particularly configured to implement the step of displaying the diagnosis assistance information to the user by: obtaining a current vehicle diagnostic process; and displaying the diagnosis assistance information to the user according to the current vehicle diagnostic process.

In a fourth aspect, the embodiments of the present solution provide a computer program product which comprises computer program, wherein when the computer program is executed by one or a plurality of processor(s), the processor is configured to implement steps in the method provided by the embodiment of the present solution in the first aspect.

Advantageous Effects

In the embodiments of the present solution, by receiving the voice command inputted by the user, obtaining the diagnosis assistance information of the vehicle according to the voice command, and displaying the diagnosis assistance information to the user, such that the user can search the diagnosis assistance information of the vehicle by way of voice before or when performing the maintenance, there is no need to look over a maintenance manual manually, an efficiency of maintenance is improved, user's time is saved, and conveniences are brought to the user.

BRIEF DESCRIPTION OF THE DRAWINGS

In order to describe the embodiments of the present invention or the technical solutions in the prior art more clearly, a brief introduction regarding the accompanying drawings that need to be used for describing the embodiments or the prior art is given below.

EMBODIMENTS

In the following description, in order to describe but not intended to limit, concrete details such as specific system structure, technique, and so on are proposed, thereby facilitating comprehensive understanding of the embodiments of the present disclosure. In some other conditions, detailed explanations of method, circuit, device and system well known to the public are omitted, so that unnecessary details can be prevented from obstructing the description of the present disclosure.

It should be understood that, when a term "comprise" is used in the description and annexed claims, the term "include" indicates existence of the described characteristics, the whole, steps, operations, elements and/or components, but not exclude existence or adding of one or a plurality of other characteristics, the whole, steps, operations, elements, components and/or combination thereof.

It should also be understood that, terms used in the description of the present disclosure are for the purpose of describing specific embodiments but not intended to limit the present disclosure. As is used in the description and the annexed claims of the present disclosure, unless other conditions are indicated clearly in the context, otherwise, singular forms of terms such as "a", "one", "the" are intended to include plural forms.

It should be further understood that, terms "and/or" used in the description and the annexed claims of the present disclosure are referred to as any combination of one or a plurality of listed item(s) associated with each other and all possible items, and including these combinations.

As is used in the description and the annexed claims, a term "if" can be interpreted as "when" or "once" or "in response to determination" or "in response to detection". Similarly, terms such as "if it is determined that", or "if it is detected that (a described condition or event)" can be interpreted as "once it is determined" or "in response to the determination" or "once it is detected that (the described condition or event)" or "in response to the detection (the described condition or event)".

In order to describe the technical solutions of present disclosure, the technical solutions of the present disclosure are described below with reference to specific embodiments.

Embodiment I

Figure 1:
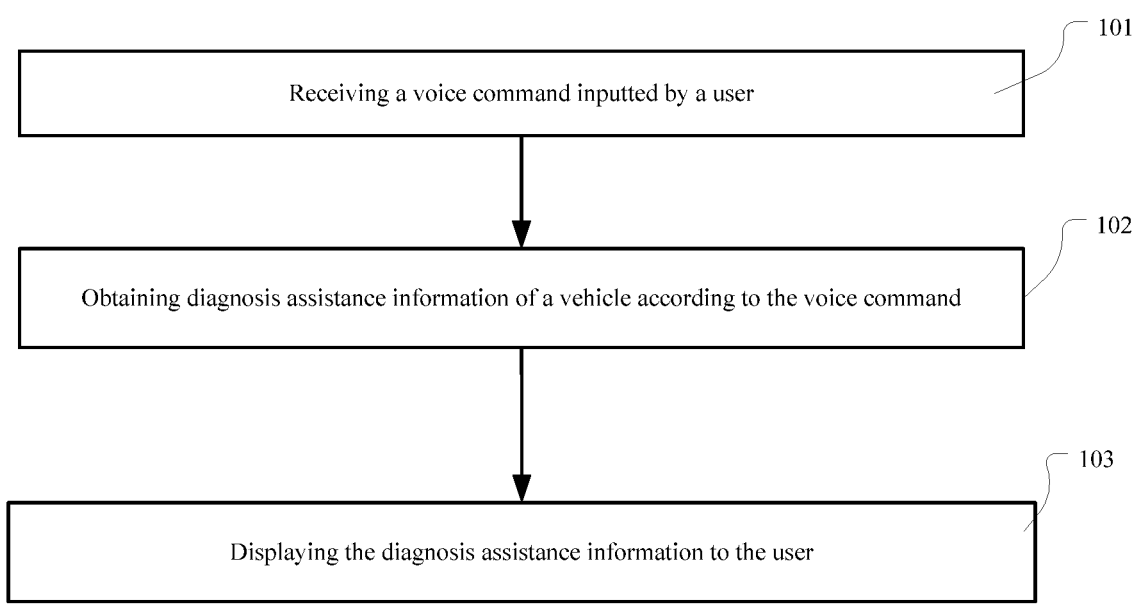
FIG. 1 illustrates a schematic flow chart of an intelligent diagnosis assistance method provided by embodiment I of the present disclosure.

Embodiment I of the present disclosure provides an intelligent diagnosis assistance method. FIG. 1 illustrates a flow chart of an intelligent diagnosis assistance method provided by embodiment I of the present solution. As shown in FIG. 1, the method in this embodiment can include following steps:

step 101, receiving a voice command inputted by a user.

The embodiment is applied in intelligent diagnosis assistance equipment, which is provided with a voice-input device such as a microphone, etc. Particularly, a user can input a voice command by using the voice-input device. In some embodiments, the equipment is a mobile phone, or a tablet, or a computer, or a vehicle diagnostic apparatus or the like.

Step 102, obtaining a diagnosis assistance information of the vehicle according to the voice command.

Wherein, the vehicle is the one that is ready to be detected, or the one that is being detected, or the one which the user is interested in, it is not limited in this embodiment.

The diagnosis assistance information is any information that is used for assisting the user in performing a diagnosis and a maintenance; for example, the diagnosis assistance information includes any one of following information: archival information, circuit diagram, accessory information, maintenance method information, maintenance record, information of maintenance experience, fault code analysis information, etc. Wherein, the archival information include any one of the following information: a vehicle type, a year model, a manufacturer, an engine type, a vehicle owner information, etc.

The diagnosis assistance information is stored in the device, or stored in the server, the device obtain the diagnosis assistance information by communicating with the server.

Concrete content of the voice command is setted according to an actual need. For example, the voice command is an instruction used for instructing a starting of searching for the diagnosis assistance information, such as "start to search", etc., the user input the instruction by way of voice, after receiving the instruction, the device search the diagnosis assistance information of the vehicle. For another example, the voice command is "start to diagnose", when receiving the instruction, the device starts to perform a diagnosis for the vehicle and obtain the diagnosis assistance information simultaneously.

Step 103, displaying the diagnosis assistance information to the user.

After the diagnosis assistance information is obtained, the diagnosis assistance information is displayed to the user. There are various presenting methods for displaying, it is not limited herein in this embodiment.

Optionally, said displaying the diagnosis assistance information to the user includes any one of following operations: displaying the diagnosis assistance information to the user; broadcasting the diagnosis assistance information to the user; transmitting the diagnosis assistance information to a user terminal, such that the user terminal broadcasts and/or present the diagnosis assistance information to the user.

Correspondingly, the device is provided with at least one of following devices: a voice broadcasting device such as a loudspeaker, etc.; a display device such as a display screen, etc.; a communication device such as a Wi-Fi device, a blue tooth device, etc. The device can be the vehicle diagnostic apparatus, the user terminal can be a mobile phone of the user, after the device obtains the diagnosis assistance information, it transmits the diagnosis assistance information to the cellphone, such that the mobile phone broadcasts and/or present the diagnosis assistance information to the user.

In some embodiments, said displaying the diagnosis assistance information to the user particularly comprises:

broadcasting the diagnosis assistance information to the user in a form of voice, and displaying the diagnosis assistance information on an interface in the form of graphics or text.

For example, the diagnosis assistance information includes a circuit diagram, etc., the device broadcasts information such as a principle of the circuit diagram, parameters of elements, connection ways, etc. to the user, and displays the circuit diagram on the interface, thereby providing convenience for the user to look over textual and graphic files, and improving an efficiency and an accuracy of maintenance.

Wherein, the interface is a user interface of an executive subject (i.e., the device) of the method in this embodiment. The user in this embodiment is referred to as the vehicle maintenance personnel, or other users such as a vehicle owner, etc.

In the intelligent diagnosis assistance method provided by this embodiment, by receiving the voice command inputted by the user, obtaining the diagnosis assistance information of the vehicle according to the voice command, and displaying the diagnosis assistance information to the user, such that the user searches the diagnosis assistance information of the vehicle by way of voice before or when performing the maintenance, there is no need to look over a maintenance manual manually, the efficiency of maintenance is improved, user's time is saved, and conveniences are brought to the user.

Embodiment II

Figure 2:
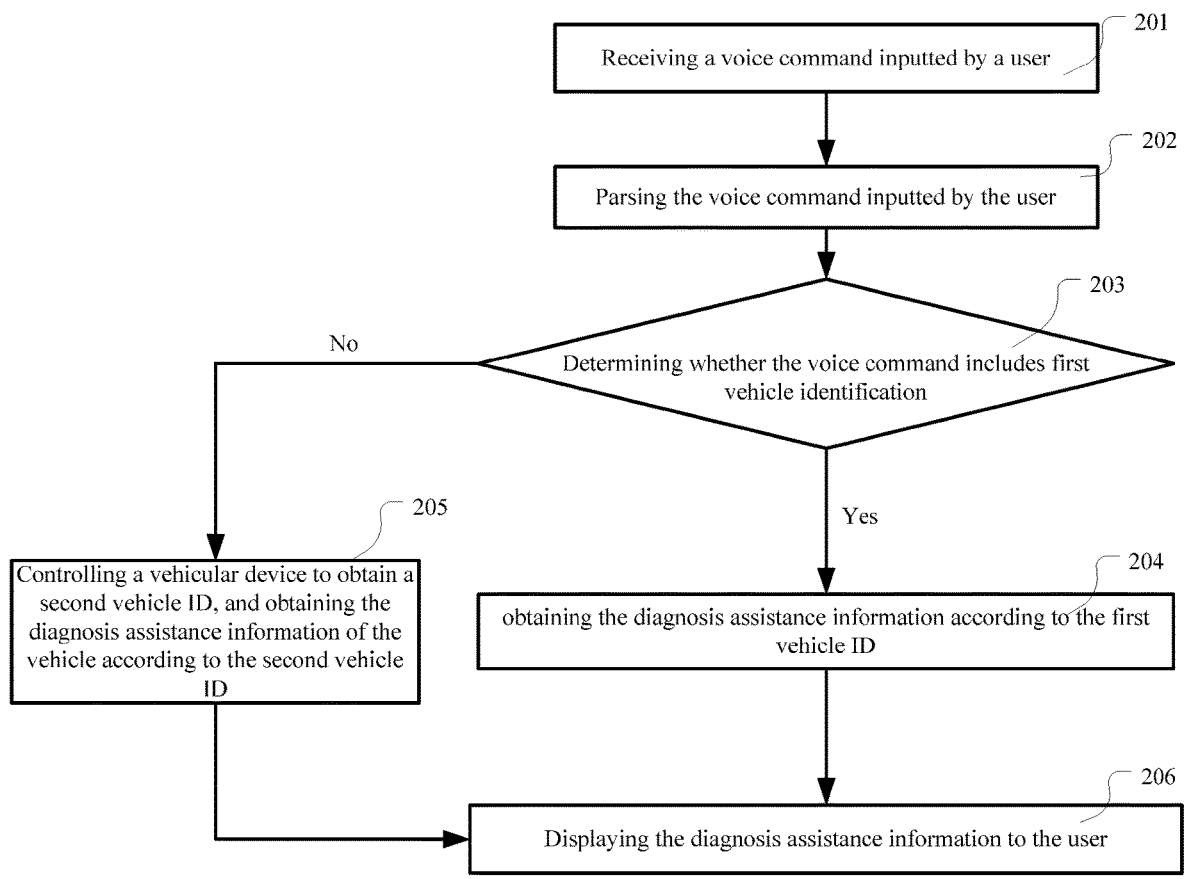
FIG. 2 illustrates a schematic flow chart of an intelligent diagnosis assistance method provided by embodiment II of the present disclosure.

Embodiment II of the present disclosure provides an intelligent diagnosis assistance method. FIG. 2 illustrates a flow chart of an intelligent diagnosis assistance method provided by embodiment II of the present solution. As shown in FIG. 2, the method in this embodiment can comprise:

Step 201, receiving a voice command inputted by a user.

Step 202, parsing the voice command.

Step 203, judging whether the voice command include a first vehicle ID (Identification). If the voice command includes the first vehicle identification, executing step 204, if the voice command doesn't include the first vehicle ID, executing step 205.

Particularly, after the voice command inputted by the user is obtained, the voice command is parsed, and whether the voice command includes the first vehicle identification is judged.

The first vehicle ID includes at least one of the following information: a vehicle license plate number, a VIN (Vehicle Identification Number), a system ID in the vehicle.

The VIN is consisted of a plurality of symbols, and includes information such as a manufacturer of the vehicle, years, a vehicle model, vehicle body type and code, motor code and assembly site, etc., and is of great importance for accurate diagnosis and maintenance of the vehicle. The system ID can be a name, a type, or a code of the system. The system can be any system or assembly in the vehicle such as a motor system, an ABS (Antilock Braking System), and so on.

For example, the user inputs "vehicle license plate number, Jing AXXXXX" by way of voice, the device parses the first vehicle ID "Jing AXXXXX" out of the voice command according to the voice command inputted by the user.

Step 204, obtaining the diagnosis assistance information of the vehicle according to the first vehicle identification, and then executing step 206.

Optionally, said obtaining the diagnosis assistance information of the vehicle comprises:

Submitting diagnosis assistance information acquisition request to a server, wherein diagnosis assistance information database is preset in the server; receiving the diagnosis assistance information returned by the server.

Particularly, the diagnosis assistance information acquisition request includes the first vehicle ID, the diagnosis assistance information database is preset in the server, the server searches the corresponding diagnosis assistance information in the diagnosis assistance information database according to the first vehicle ID.

Optionally, the diagnosis assistance information database includes a plurality of databases that is used for storing much diagnosis assistance information. For example, the plurality of databases includes a vehicle archive database configured to store archive information, a historical diagnosis database configured to store historical diagnostic information, and a maintenance database configured to store maintenance information respectively.

Since the diagnosis assistance information needs to be accumulated over a long period, thus, it is possible to cooperate with the existing maintenance information companies and data companies to integrate all diagnosis assistance information. Further, it is also possible to establish a retrieval data correspondence database configured to retrieve all these databases described above; meanwhile, an organization and a retrieval of each of the databases are designed according to a four-layered sequence, that is, a manufacturer, a vehicle type, a year model, and an engine type.

Particularly, when the server obtains the first vehicle ID, it searches the manufacturer, the vehicle model, the year model, and the engine type of the vehicle in the retrieval data correspondence database according to the first vehicle identification, and then search the various databases according to the manufacturer, the vehicle model, the year model, and the engine type of the vehicle, thereby obtaining the detailed diagnosis assistance information.

By setting the plurality of databases at a server side, a search can be performed more conveniently, and a search result can be more accurate and more reliable.

Furthermore, the device also uploads information of the vehicle to the server for the server to update database. The information of the vehicle includes but not limited to: a diagnostic result of the vehicle, record data of the vehicle such as freeze frame data, geographic location data, etc. A self-learning functionality of the database can be implemented by uploading data, such that the diagnosis assistance information in the database can be complemented and corrected continually.

Step 205, obtaining a second vehicle ID (Identification) according to the vehicular device, and obtaining the diagnosis assistance information of the vehicle according to the second vehicle ID, and then executing step 206.

If the voice command doesn't include the first vehicle ID, the second vehicle ID will be obtained automatically.

Particularly, the intelligent diagnosis assistance device is provided therein with an OBD (On-Board Diagnosis) interface, or as an alternative, this device can be connected to the OBD interface. The OBD interface is an on-line diagnostic interface of the vehicle, and can be used for implementing functionalities such as reading vehicle data, writing procedures, etc.

The vehicular device is the device in the vehicle, which is configured to be connected with the intelligent diagnosis assistance device, the intelligent diagnosis assistance device is connected with the vehicular device through the OBD interface, and obtain the second vehicle ID through the vehicular device. The second vehicle ID is such as the vehicle license plate number or the VIN, etc.

Of course, except for the method of OBD, the vehicular device also communicates with the intelligent diagnosis assistance device by other ways, which is not limited in this embodiment. For example, the vehicular device pre-stores the second vehicle ID, and the vehicular device transmits the second vehicle ID to the intelligent diagnosis assistance device by means of, such as Wi-Fi.

After the intelligent diagnosis assistance device obtains the second vehicle ID, it can obtain the diagnosis assistance information of the vehicle according to the second vehicle ID. In this step which is similar to step 203, the diagnosis assistance information acquisition request is submitted to the server, and the diagnosis assistance information returned by the server is received. Wherein, the diagnosis assistance information acquisition request includes the second vehicle identification, such that the server returns back the corresponding diagnosis assistance information according to the second vehicle ID.

In this embodiment, said obtaining the diagnosis assistance information of the vehicle according to the voice command is implemented by executing steps 202-205.

Step 206, displaying the diagnosis assistance information to the user.

A concrete implementation principle of step 206 in this embodiment is similar to that of step 103 in embodiment I, it is not repeatedly descried herein.

In the intelligent diagnosis assistance method provided in this embodiment, by parsing the voice command, judging whether there exists the first vehicle ID in the voice command, obtaining the diagnosis assistance information of the vehicle according to the first vehicle ID if there exists the first vehicle ID in the voice command, such that the user inputs information that he/she wants to search by way of voice, a customized need of the user can be satisfied; if there doesn't exist the first vehicle ID, by controlling the vehicular device to obtain the second vehicle ID, and obtaining the diagnosis assistance information of the vehicle according to the second vehicle ID, such that the diagnosis assistance information which is corresponding to the vehicle and is ready to be diagnosed currently or is being diagnosed can be obtained fast and accurately, it is unnecessary for the user to memorize an identifier of the vehicle, there is a stronger applicability.

Embodiment III

Figure 3:
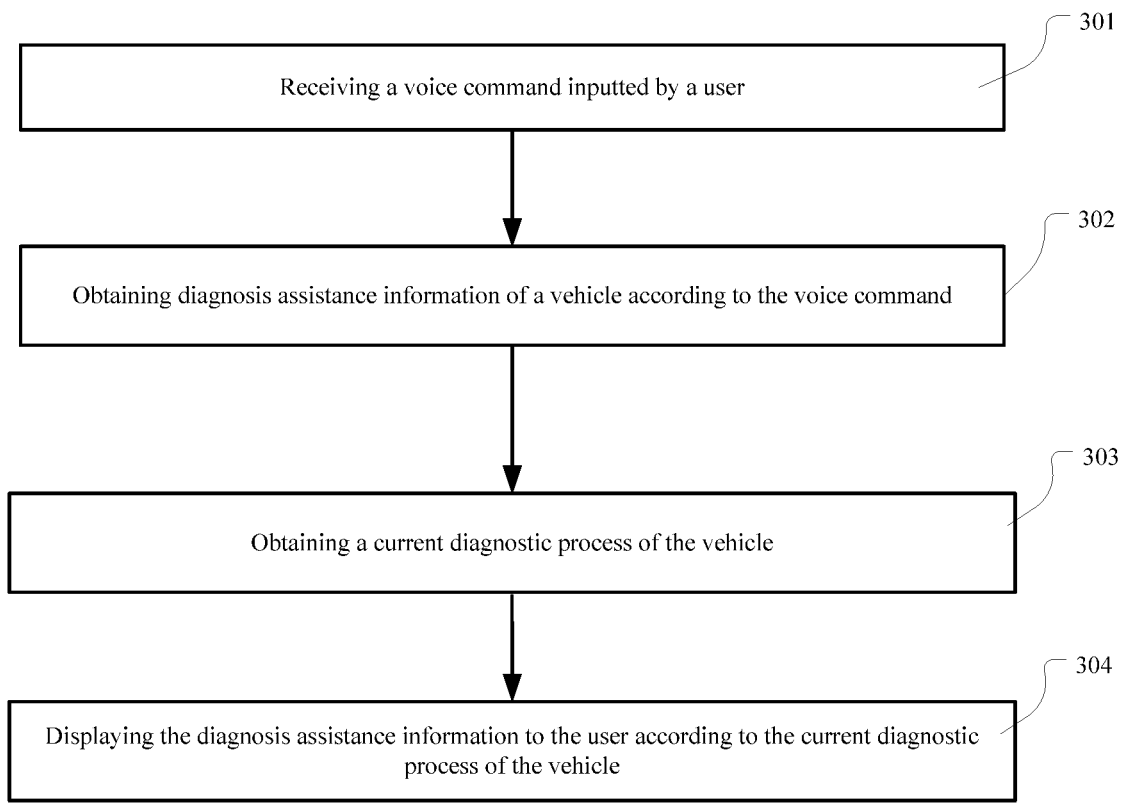
FIG. 3 illustrates a schematic flow chart of an intelligent diagnosis assistance method provided by embodiment III of the present disclosure.

Embodiment III of the present solution provides an intelligent diagnosis assistance method. FIG. 3 illustrates a flow chart of the intelligent diagnosis assistance method provided by Embodiment III of the present solution. As shown in FIG. 3, the method in this embodiment can include:

Step 301, receiving a voice command inputted by a user.

Step 302, obtaining diagnosis assistance information according to the voice command.

In this embodiment, regarding concrete implementation principle of steps 301-302, reference is made to the aforesaid various embodiments, it is not repeatedly described herein.

Step 303, obtaining current vehicle diagnosis process.

Step 304, displaying diagnosis assistance information to the user according to the current vehicle diagnosis process.

In this embodiment, the intelligent diagnosis assistance device presents the diagnosis assistance information to the user according to a diagnosing process. Particularly, the intelligent diagnosis assistance device is connected to the vehicle through the OBD interface, and perform a diagnosis for the vehicle.

Optionally, the diagnosing process includes phases such as initialization, processing, and ending, etc. Methods of presenting the diagnosis assistance information corresponding to different phases would be different.

In an initialization phase, the voice command is parsed, description information of failure in the voice command is obtained, and information of a system or an assembly which may malfunctions is broadcasted to the user according to the fault description information, and information including a circuit diagram and relevant maintenance information of the system or the assembly is displayed.

For example, the user inputs "the front of the vehicle leaks water" by way of voice, this device judges that it is an engine system which may malfunction according to the description of failure, and broadcasts this judgment to the user by way of voice, and display textual and graphical information of the engine system simultaneously.

In the processing phase, fault codes, failure information will be broadcasted, and a dynamic circuit diagram, failure information and etc. are displayed in a graphical and a textual form.

Optionally, in a diagnosing process, the diagnosis assistance information of the system which is being diagnosed currently in the vehicle can be obtained, and the diagnosis assistance information of the system is displayed to the user.

For example, if the system that is being diagnosed currently is the engine system, it is possible to transmit an identification information of the engine system to the server, thereby obtaining the diagnosis assistance information of the engine system including the circuit diagram of the engine system, the maintenance files, and presenting the diagnosis assistance information of the engine system to the user, and thereby providing convenience for the user to perform a diagnosis and a maintenance for the vehicle.

In an ending phase, information including a diagnostic report and a clear code result are broadcasted and displayed on an interface in a textual and graphic way.

Optionally, information of accessories of the vehicle that need to be changed is also determined according to the diagnostic result of the vehicle.

Particularly, by performing the diagnosis for the vehicle, which accessories of the vehicle malfunction can be determined, these fault accessories are considered as the ones that need to be switched. The accessory information is a name of the accessory, or a model of the accessory, etc. After the information of the accessories that need to be switched is obtained, the information of the accessories is transmitted to the server by which commodity information corresponding to the accessory information is searched in an on-line shopping mall.

The accessory information corresponds to one or a plurality of commodity information. Wherein, the commodity information corresponding to the accessory information is the one which contains the accessory information and is provided by a merchant; for example, if the accessory information is a "temperature sensor", the commodity information is the one that contains the word of "temperature sensor". Alternatively, the commodity information corresponding to the accessory information is the one which has a similarity to the accessory information larger than a preset threshold value. The commodity information includes the name of the commodity, the model of the commodity, etc., and includes a price of the commodity, a place of dispatch, a direction for use, etc.

After the commodity information is obtained, the commodity information is displayed to the user. For example, information such as "the fault accessory is the temperature sensor, N types of temperature sensors are searched in the on-line shopping mall, they are 1: XX brand temperature sensor which has a price of XX Yuan and is delivered from Beijing, 2: XX brand temperature sensor which has a price of XX Yuan and is delivered from Shanghai, . . . etc. respectively". Or as an alternative, the commodity information and the corresponding purchase link is displayed to the user directly, so that the user acquires the detailed information of the accessories.

Furthermore, the commodity information which is selected from the commodity information and is expected to be purchased by the user can also be received; a delivery information is obtained according to the commodity information inputted by and expected to be purchased by the user, and an order information is generated according to the commodity information expected to be purchased and the delivery information; the order information can be transmitted to the server, such that the server can allocate delivery tasks according to the order information.

According to said assumption, after the commodity information is broadcasted to the user, the user inputs "selecting a first temperature sensor" or "selecting XX brand temperature sensor" by way of voice, then, the device transmits the order information to the server according to the commodity information selected by the user and the delivery information, thereby implementing a selective purchasing of the accessories.

The delivery information includes delivery position information and/or a contact way of the user. After the server sends the delivery tasks, a delivery man or a delivery organization delivers the commodity selected to be purchased by the user to a corresponding location, or contact and communicate with the user regarding matters on delivery.

Optionally, said obtaining the delivery information, and generating the order information according to the information of commodity that is expected to be purchased, and the delivery information can include: obtaining geographic location information of the vehicle, and generating the order information according to the geographic location information and the information of the commodity that is expected to be purchased.

In this way, the delivery man or the delivery organization delivers the commodity that is selected to be purchased by the user to the place where the vehicle is located, it is convenient for the user to replace accessories for the vehicle directly, and an efficiency of replacement of accessories is improved.

As an alternative, said obtaining the delivery information, and generating the order information according to the information of commodity that is expected to be purchased and the delivery information comprises: transmitting a search instruction to the server, wherein the search instruction includes a vehicle ID, such that the serve searches the vehicle owner information of the vehicle according to the search instruction; receiving the vehicle owner information sent by the server, and generating the order information according to the vehicle owner information and the information of commodity expected to be purchased.

The vehicle owner information includes a name, a telephone number, an address of the vehicle owner, etc. The vehicle identification information is obtained according to an OBD (On-Board Diagnosis) interface or by other ways.

In this way, the delivery man or the delivery organization communicates with the vehicle owner regarding delivery matters directly, there is no need for the user to input information including the contact way, convenience is brought to the user.

In the intelligent diagnosis assistance method provided by this embodiment, by obtaining the current vehicle diagnosing process, and displaying the diagnosis assistance information to the user according to the current vehicle diagnosing process, such that presenting of the diagnosis assistance information is adaptive to the diagnosing process, and the efficiency of diagnosis and maintenance is improved.

Based on the technical solutions provided by the various embodiments described above, preferably, when the diagnosis assistance information includes at least two types, a pushing of the diagnosis assistance information can be implemented by executing a plurality of steps.

Particularly, the voice command inputted by the user can be obtained firstly, and the diagnosis assistance information of the vehicle is obtained according to the voice command, when the diagnosis assistance information includes at least two types, the type of the diagnosis assistance information can be broadcasted to the user firstly, such that the user can choose detailed information he/she wants to look over according to the type of the diagnosis assistance information, conveniences are brought to the user.

Optionally, this type is a classification of the diagnosis assistance information, can include, for example, a circuit diagram, an accessory information, a maintenance method, a maintenance record, a maintenance experience information, a fault code parsing information, and so on.

Correspondingly, after obtaining the diagnosis assistance information, this device broadcasts "please choose a classification that is expected to be watched and listed as follows: the circuit diagram, the accessory information, the maintenance method, the maintenance record, the maintenance experience information, the fault code parsing information", and then receive the voice command inputted by the user again, determine the classification which is expected to be watched and chosen by the user from the types of the diagnosis assistance information according to the voice command received once again. For example, when the user wants to look over a maintenance record of the vehicle, he/she inputs "maintenance record" by way of voice, this device broadcasts a corresponding maintenance record to the user according to the voice command inputted by the user, the broadcasting can either be a voice broadcast or be a video broadcast. When the type selected by the user is a circuit diagram, a corresponding dynamic circuit diagram can be broadcasted.

Optionally, said type can also be system information corresponding to the diagnosis assistance information, for example, said type can be "of the engine system, of the ABS (Anti-block braking System), of an electrical control system", etc.

Correspondingly, the device broadcasts "please choose an option that is expected to be watched: diagnosis assistance information of the engine system, diagnosis assistance information of the ABS, diagnosis assistance information of the electrical control system" to the server by way of voice; the user can input the option that he/she wants to watch by way of voice, such as "engine system" or "the diagnosis assistance information of the engine system", the device can broadcast the diagnosis assistance information of the engine system to the user according to the voice command inputted by the user.

Based on the technical solutions provided by the various embodiments described above, preferably, it is also possible to receive diagnostic procedure information inputted by the user, and perform the corresponding diagnostic procedure according to the diagnostic procedure information. The diagnostic procedure can include one of the following operations: reading fault codes, clearing fault codes, reading system information, movement testing, ending diagnosis, watching report, printing report, etc.

For example, the user inputs "reading fault code" by way of voice, the device then performs a fault code reading operation. In this way, each step in the diagnosing process is controlled by the user by way of voice, conveniences are brought to the user, and an operability of diagnosis is improved.

Based on the technical solutions provided by the various embodiments, preferably, it is also possible to obtain a diagnostic result of the vehicle and transmit the diagnostic result to the server, such that the server can search the corresponding maintenance help information according to the diagnostic result; the maintenance help information sent by the server can be received, and the maintenance help information can be pushed to the user.

On a server side, the diagnostic result and the maintenance help information can be stored in association. After the diagnostic result of the vehicle that is to be diagnosed is obtained, the corresponding maintenance help information can be obtained from the server, which helps the user to carry out maintenance aiming at the fault that has been diagnosed, an efficiency and an accuracy of maintenance are improved.

Based on the technical solutions provided by the various embodiments, preferably, a diagnostic process of the vehicle can be an intelligent and automatic diagnostic process. The intelligent and automatic process can include: obtaining the vehicle ID, such as the vehicle plate information or the vehicle identification code, and transmitting the vehicle ID to the server; the server can search the vehicle type information corresponding to the vehicle ID in a database, and control the device to initiate a corresponding diagnostic software, thereby performing a diagnosis for the vehicle.

Different diagnostic software is applicable to different types of vehicles; for example, vehicle type A corresponds to a diagnostic software 1, vehicle type B corresponds to a diagnostic software 2, if it is detected that the vehicle type information that corresponds to the current vehicle is A, the diagnostic software 1 is launched so as to perform the diagnosis for the vehicle. In the intelligent self-diagnosis process, by obtaining the vehicle ID information, the corresponding diagnostic software can be initiated automatically, there is no need for the user to input vehicle information manually.

In the technical solutions provided by the various embodiments described above, parsing the voice command inputted by the user can be accomplished by voice recognition software which can convert the voice command inputted by the user into a corresponding text or command. In an actual application, the voice recognition software can resident in the background, when the user needs to search the diagnosis assistance information, he/she only needs to speak a voice command such as "maintenance help", then, steps in any one of the embodiments described above can be started to obtain the diagnosis assistance information and broadcast the diagnosis assistance information to the user in way of voice. At the time of voice broadcast, the user can also look over textual and graphical files, an interruption of a diagnosis of the vehicle is unnecessary.

It should be understood that, value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present disclosure.

Embodiment IV

Figure 4:
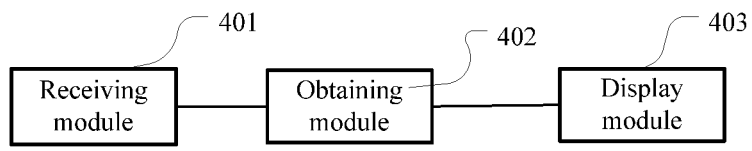
FIG. 4 illustrates a schematic block diagram of an intelligent diagnosis assistance device provided by embodiment IV of the present disclosure.

Embodiment IV of the present solution provides an intelligent diagnosis assistance device. FIG. 4 illustrates a schematic block diagram of the intelligent diagnosis assistance device provided by Embodiment IV of the present solution. For describing conveniently, the part that is related with the embodiment of the present solution is illustrated merely. The intelligent diagnosis assistance device may be a software unit, a hardware unit, or a unit of combination of software and hardware arranged in the intelligent diagnosis assistance device, it may also be taken as an independent pendant which is integrated into the intelligent diagnosis assistance device.

As shown in FIG. 4, the device in this embodiment can comprise:

a receiving module 401 configured to receive a voice command inputted by a user;

an obtaining module 402 configured to obtain diagnosis assistance information of a vehicle according to the voice command; and a display module 403 configured to present the diagnosis assistance information to the user.

The intelligent diagnosis assistance device in this embodiment is used for performing the intelligent diagnosis assistance method in any one the embodiments described above, regarding a detailed implementation principle, please refer to any one of the aforesaid embodiments, it is not repeatedly described herein.

By receiving, via the intelligent diagnosis assistance device provided by this embodiment, the voice command inputted by the user, obtaining the diagnosis assistance information according to the voice command, and displaying the diagnosis assistance information to the user, such that the user searches the diagnosis assistance information by way of voice before or when performing a maintenance, there is no need to look over a maintenance manual manually, an efficiency of maintenance is improved, user's time is saved, and conveniences are brought to the user.

Optionally, the obtaining module 402 is particularly configured to:

parse the voice command;

determine whether the voice command includes a first vehicle identification; and obtain the diagnosis assistance information according to the first vehicle identification if the voice command includes the first vehicle identification; or control a vehicular device to obtain a second vehicle identification, and obtain the diagnosis assistance information of the vehicle according to the second vehicle identification if the voice command doesn't include the first vehicle identification.

Wherein, said obtaining the diagnosis assistance information of the vehicle comprises:

submitting diagnosis assistance information acquisition request to a server; wherein diagnosis assistance information database is preset in the server; and receiving the diagnosis assistance information returned by the server.

Optionally, the display module 403 is particularly configured to:

broadcast the diagnosis assistance information to the user in a form of speech, and display the diagnosis assistance information on an interface in the form of graphics or text.

Optionally, the display module 403 is particularly configured to:

obtain a current vehicle diagnostic process; and present the diagnosis assistance information to the user according to the current vehicle diagnostic process.

Optionally, the display module 403 is further configured to:

determine information of an accessory that needs to be replaced according to a diagnostic result of the vehicle;

obtain a commodity information corresponding to the information of the accessory in an on-line shopping mall; and display or broadcast the commodity information to the user.

Optionally, the display module 403 is also configured to:

receive an information of a commodity which is selected from the commodity information and is expected to be purchased by the user;

obtain a delivery information according to the information of the commodity inputted by and expected to be purchased by the user, and generate an order information according to the information of the commodity expected to be purchased and the delivery information; and transmit the order information to the server, such that the server assigns delivery tasks according to the order information.

It is clearly understood by one or ordinary skill in the art that, for describing conveniently and concisely, dividing of the aforesaid various functional units, functional modules is exemplified merely, in an actual application, the aforesaid functions is assigned to different functional units and functional modules to be accomplished, that is, an inner structure of a data synchronizing device is divided into functional units or modules so as to accomplish the whole or a part of functionalities described above. The various functional units, modules in the embodiments is integrated into a processing unit, or each of the units exists independently and physically, or two or more than two of the units are integrated into a single unit. The aforesaid integrated unit is either realized in the form of hardware or in the form of software functional units. In addition, specific names of the various functional units and modules are only used for distinguishing from each other conveniently, but not intended to limit the protection scope of the present disclosure. Regarding a specific working process of the units and modules in the aforesaid device, please refer to a corresponding process in the aforesaid method embodiments, it is not repeatedly described herein.

Embodiment V

Figure 5:
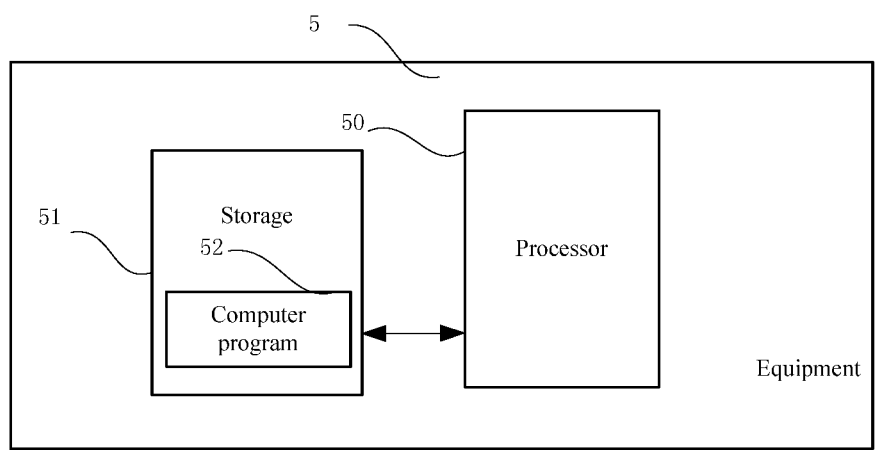
FIG. 5 illustrates a schematic block diagram of an intelligent diagnosis assistance equipment provided by embodiment V of the present disclosure.

Embodiment V of the present solution provides an intelligent diagnosis assistance equipment. FIG. 5 illustrates a schematic block diagram of the intelligent diagnosis assistance equipment provided by embodiment V of the present solution. As shown in FIG. 5, the equipment 5 in this embodiment comprises: one or a plurality of processor(s) 50, a storage device 51 and computer program 52 stored in the storage device 51 and is executed by the processor 50. The processor 50 implements steps in the various intelligent diagnosis assistance method embodiments when executing the computer program 52.

Particularly, when the computer program 52 is executed by the processor 50, the processor 50 is configured to implement following steps of:

receiving a voice command inputted by a user;

obtaining diagnosis assistance information of a vehicle according to the voice command; and displaying the diagnosis assistance information to the user.

Optionally, the processor is particularly configured to implement the step of obtaining the diagnosis assistance information of the vehicle according to the voice command by:

parsing the voice command;
determining whether the voice command includes a first vehicle identification; and
obtaining the diagnosis assistance information according to the first vehicle identification if the voice command includes the first vehicle identification; or
controlling a vehicular device to obtain a second vehicle identification, and obtaining the diagnosis assistance information of the vehicle according to the second vehicle identification, if the voice command doesn't include the first vehicle identification.

Optionally, the processor is particularly configured to implement the step of obtaining the diagnosis assistance information by:

submitting diagnosis assistance information acquisition request to a server; wherein diagnosis assistance information database is preset in the server; and
receiving the diagnosis assistance information returned by the server.

Optionally, the processor is particularly configured to implement the step of displaying the diagnosis assistance information to the user by:

broadcasting the diagnosis assistance information to the user in a form of speech, and presenting the diagnosis assistance information on an interface in the form of graphics or text.

Optionally, the processor is particularly configured to implement the step of presenting the diagnosis assistance information to the user by:

obtaining a current vehicle diagnostic process; and
displaying the diagnosis assistance information to the user according to the current vehicle diagnostic process.

Optionally, when the computer program 52 is executed by the processor 50, the processor 50 is further configured to implement following steps of:

determining information of an accessory that needs to be replaced according to a diagnostic result of the vehicle;
obtaining a commodity information corresponding to the information of the accessory in an on-line shopping mall; and
presenting or broadcasting the commodity information to the user.

Optionally, when the computer program 52 is executed by the processor 50, the processor 50 is further configured to implement following steps of:

receiving an information of a commodity that is selected from the commodity information and is expected to be purchased by the user;
obtaining a delivery information according to the information of the commodity which is inputted by and is expected to be purchased by the user, and generating an order information according to the information of the commodity expected to be purchased and the delivery information; and
transmitting the order information to the server in order that the server assigns delivery tasks according to the order information.

As yet an alternative, when the computer program 50 is executed by the processor 50, functionalities of the various modules/units in the aforesaid device embodiments such as the functionalities of modules 401-404 shown in FIG. 4 are achieved.

The equipment 5 includes but is not limited to: the processor 50, and the storage device 51. It is understood for one of ordinary skill in the art that, FIG. 5 is merely an example of the equipment 5, and is not constituted as limitation to the equipment 5, more or less components shown in FIG. 5 may be included, or some components or different components may be combined; for example, the equipment 5 also includes an input and output device, a network access device, a bus, etc.

The so called processor 50 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The storage device 51 can be an internal storage unit of the equipment 5, such as a hard disk or a memory of the equipment 5. The storage device 51 can also be an external storage device of the equipment 5, such as a plug-in hard disk, a SMC (Smart Media Card), a SD (Secure Digital) card, a FC (Flash Card) equipped on the equipment 5. Further, the storage device 51 may include both the internal storage unit and the external storage device of the equipment 5, either. The storage device 51 is configured to store the computer programs, and other procedures and data needed by the equipment 5. The storage device 51 is also configured to store data that has been output or being ready to be output temporarily.

Preferably, the equipment 5 can be cellphone, a tablet device, a computer, etc., and can be a diagnostic equipment such as the diagnostic equipment with the type of X431 PRO/PRO3S/PADIII and manufactured by SHENZHEN LAUNCH SOFTWARE CO., LTD.

Optionally, the equipment 5 can also include a diagnostic module configured to be connected to the vehicle, an interface of the diagnostic module can be OBDII-16 (i.e., a diagnostic interface having 16 standard pins and opened by OBD), the diagnostic module can include a physical layer and a link layer communicated with vehicle communication protocol, the link layer includes all vehicle diagnosis communication protocols.

Optionally, the equipment 5 further includes a network communication device such as a 3G module, a 4G module, a 5G module, a Wi-Fi module, etc., which is configured to implement a communication with the server.

Optionally, the equipment 5 further comprises a positioning device, the positioning device can include at least one of the following modules: GPS (Global Positioning System) module, AGPS (Assisted Global Positioning System), BD (Beidou Navigation Positioning System) module, GLONASS satellite navigation module, etc. which are configured to obtain geographical positioning information.

Optionally, the equipment 5 further comprises a voice inputting device which may be such as a microphone that supports the voice command inputted by the user, and so on.

Optionally, the equipment 5 further comprises a broadcasting device, the broadcasting device is a loudspeaker, etc. which is configured to broadcast the diagnosis assistance information.

Optionally, the equipment 5 further comprises a displaying device, the displaying device is a display screen, etc. which is configured to display the diagnosis assistance information.

An embodiment of the present solution further provides a computer readable storage medium which stores computer program, when the computer program is executed by the processor, the processor is configured to implement steps in the method of intelligent diagnosis assistance method in any one of the aforesaid embodiments.

An embodiment of the present solution further provides a computer procedure product, the computer procedure product comprises a computer procedure, when the computer procedure is executed by one or a plurality of processor(s), the processor is configured to implement steps in the intelligent diagnosis assistance method in any one of the aforesaid embodiments.

In the embodiments of the present disclosure, the descriptions of the embodiments in the present disclosure are emphasized respectively, in regard to the part without detailed description in some embodiments, please refer to related description in other embodiments.

The one of ordinary skill in the art will notice that, the elements and algorithm steps of each of the examples described in connection with the embodiments disclosed herein is implemented in electronic hardware, or in combination with computer software and electronic hardware. Whether these functions are implemented by hardware or software depends on the specific application and design constraints of the technical solution. The skilled people could use different methods to implement the described functions for each particular application, but such implementations should not be considered as going beyond the scope of the present disclosure.

It should be understood that, in the embodiments of the present disclosure, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present disclosure can be integrated into a single processing unit, or exist individually and physically, or two or more than two units are integrated into a single unit. The aforesaid integrated unit is either achieved by hardware, or achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present disclosure is also accomplished by computer program configured to instruct relevant hardware. When the computer program is executed by the processor, the steps in the various method embodiments described above are implemented. Wherein, the computer program comprises computer program codes, which is in the form of source code, object code, executable documents or some intermediate form, etc. The computer readable medium includes: any entity or device that carries the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium are added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present disclosure. Although the present disclosure has been explained in detail with reference to the above-described embodiments, it should be understood for the one of ordinary skill in the art that, the technical solutions described in each of the above-described embodiments can still be amended, or some technical features in the technical solutions is replaced equivalently; these amendments or equivalent replacements, which won't make the essential of corresponding technical solution to be broken away from the spirit and the scope of the technical solution in various embodiments of the present disclosure, should all be included in the protection scope of the present disclosure.

What is claimed is:

1. An intelligent diagnosis assistance method, comprising:
receiving a voice command inputted by a user;
obtaining diagnosis assistance information of a vehicle from a diagnosis assistance information database of a server according to the voice command; and
displaying the diagnosis assistance information to the user;
wherein said obtaining the diagnosis assistance information of the vehicle according to the voice command particularly comprises:
parsing the voice command;
determining whether the voice command includes a first vehicle identification; and
obtaining the diagnosis assistance information from the diagnosis assistance information database of the server according to the first vehicle identification, if the voice command includes the first vehicle identification; or
controlling a vehicular device to obtain a second vehicle identification and obtaining the diagnosis assistance information of the vehicle from the diagnosis assistance information database of the server according to the second vehicle identification, if the voice command doesn't include the first vehicle identification.

2. The method according to claim 1, wherein said obtaining the diagnosis assistance information of a vehicle from a diagnosis assistance information database of a server according to the voice command particularly comprises:
submitting diagnosis assistance information acquisition request to the server; and
receiving the diagnosis assistance information returned by the server.

3. The method according to claim 1, wherein said displaying the diagnosis assistance information to the user particularly comprises:

sending the diagnosis assistance information to the user in a form of voice, and displaying the diagnosis assistance information on an interface in the form of graphics or text.

4. The method according to claim 1, wherein said displaying the diagnosis assistance information to the user particularly comprises:
obtaining a current vehicle diagnostic process; and
displaying the diagnosis assistance information to the user according to the current vehicle diagnostic process.

5. An intelligent diagnosis assistance equipment, comprising a storage device, a processor and computer program stored in the storage device and executable by the processor, wherein when the computer program is executed by the processor, the processor is configured to implement steps in an intelligent diagnosis assistance method, comprising:
receiving a voice command inputted by a user;
obtaining diagnosis assistance information of a vehicle from a diagnosis assistance information database of a server according to the voice command; and
displaying the diagnosis assistance information to the user;
wherein the processor is particularly configured to perform the step of obtaining the diagnosis assistance information of the vehicle from a diagnosis assistance information database of a server according to the voice command by parsing the voice command;
determining whether the voice command includes a first vehicle identification; and obtaining the diagnosis assistance information from the diagnosis assistance information database of the server according to the first vehicle identification, if the voice command includes the first vehicle identification; or controlling a vehicular device to obtain a second vehicle identification and obtaining the diagnosis assistance information of the vehicle from the diagnosis assistance information database of the server according to the second vehicle identification, if the voice command doesn't include the first vehicle identification.

6. The intelligent diagnosis assistance equipment according to claim 5, wherein the processor is particularly configured to implement the step of obtaining the diagnosis assistance information by:
submitting diagnosis assistance information acquisition request to the server; and
receiving the diagnosis assistance information returned by the server.

7. The intelligent diagnosis assistance equipment according to claim 5, wherein the processor is particularly configured to implement the step of displaying the diagnosis assistance information to the user by:
sending the diagnosis assistance information to the user in a form of voice, and displaying the diagnosis assistance information on an interface in the form of graphics or text.

8. The intelligent diagnosis assistance equipment according to claim 5, wherein the processor is particularly configured to implement the step of displaying the diagnosis assistance information to the user by:
obtaining a current vehicle diagnostic process; and
displaying the diagnosis assistance information to the user according to the current vehicle diagnostic process.

9. A non-transitory computer readable storage medium which stores computer program, wherein when the computer program is executed by a processor, the processor is configured to implement steps in an intelligent diagnosis assistance method, comprising:
receiving a voice command inputted by a user;
obtaining diagnosis assistance information of a vehicle from a diagnosis assistance information database of a server according to the voice command; and
displaying the diagnosis assistance information to the user;
wherein the processor is particularly configured to implement the step of obtaining the diagnosis assistance information of the vehicle according to the voice command by:
parsing the voice command;
determining whether the voice command includes a first vehicle identification; and
obtaining the diagnosis assistance information from the diagnosis assistance information database of the server according to the first vehicle identification, if the voice command includes the first vehicle identification; or
controlling a vehicular device to obtain a second vehicle identification and obtaining the diagnosis assistance information of the vehicle from the diagnosis assistance information database of the server according to the second vehicle identification, if the voice command doesn't include the first vehicle identification.

10. The non-transitory computer readable storage medium according to claim 9, wherein the processor is particularly configured to implement the step of obtaining the diagnosis assistance information by:
submitting diagnosis assistance information acquisition request to a server; and
receiving the diagnosis assistance information returned by the server.

11. The non-transitory computer readable storage medium according to claim 9, wherein the processor is particularly configured to implement the step of displaying the diagnosis assistance information to the user by:
sending the diagnosis assistance information to the user in a form of voice, and displaying the diagnosis assistance information on an interface in the form of graphics or text.

12. The non-transitory computer readable storage medium according to claim 9, wherein the processor is particularly configured to implement the step of displaying the diagnosis assistance information to the user by:
obtaining a current vehicle diagnostic process; and
displaying the diagnosis assistance information to the user according to the current vehicle diagnostic process.

* * * * *